No. 613,683. Patented Nov. 8, 1898.
A. S. KEMP.
WINDOW CLEANER.
(Application filed June 7, 1898.)
(No Model.)
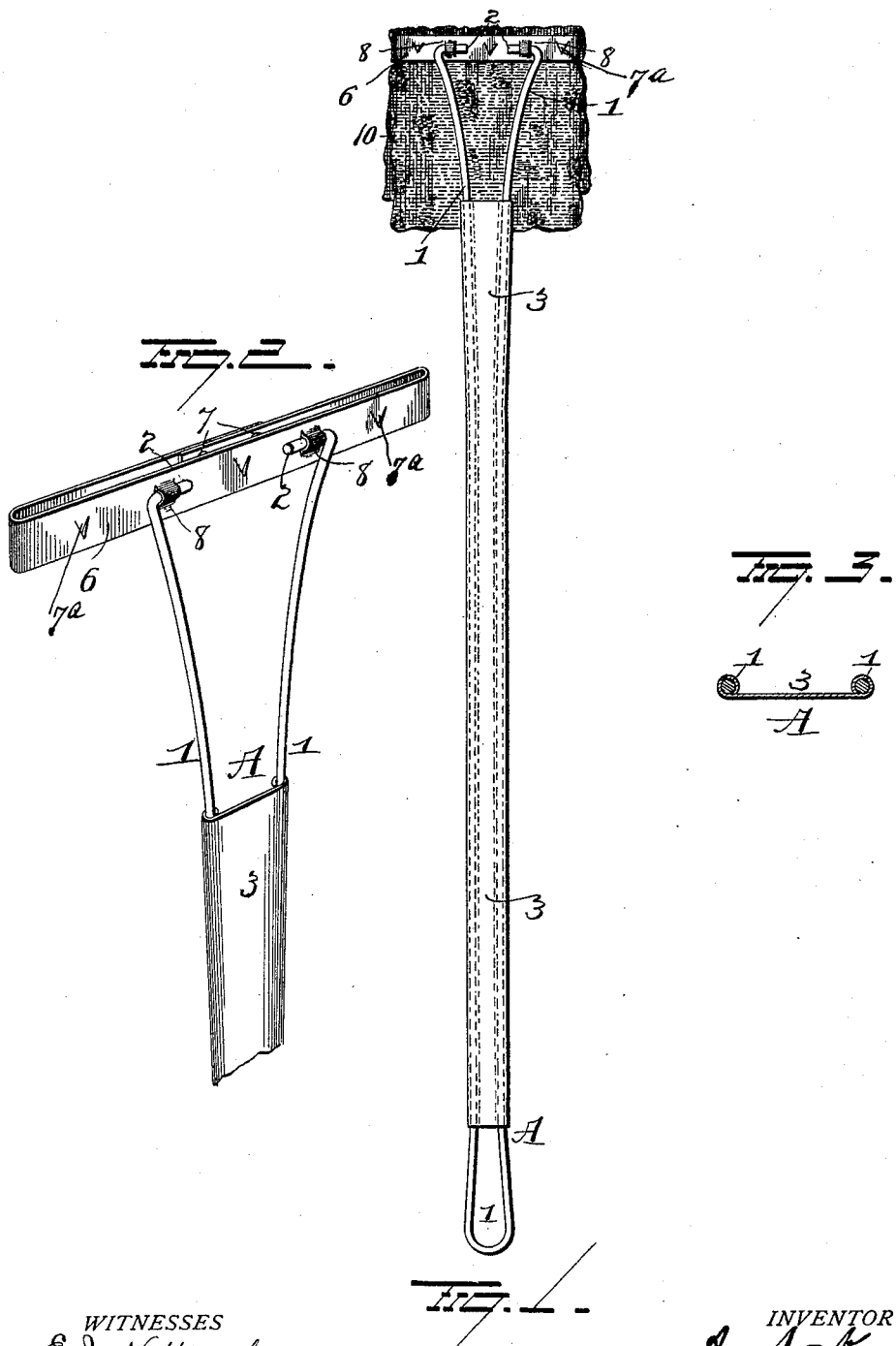

UNITED STATES PATENT OFFICE.

ALICE S. KEMP, OF NEW YORK, N. Y.

WINDOW-CLEANER.

SPECIFICATION forming part of Letters Patent No. 613,683, dated November 8, 1898.

Application filed June 7, 1898. Serial No. 682,838. (No model.)

*To all whom it may concern:*

Be it known that I, ALICE S. KEMP, of New York, in the county of New York and State of New York, have invented certain new and useful Improvements in Window-Cleaners; and I do hereby declare the following to be a full, clear, and exact description of the invention, such as will enable others skilled in the art to which it appertains to make and use the same.

My invention relates to an improvement in window-cleaners, the object being to provide a device which will be simple in construction, cheap to manufacture, and which will be effectual in operation.

With this end in view my invention consists in certain novel features of construction and combinations of parts, as will be hereinafter more fully described, and pointed out in the claims.

In the accompanying drawings, Figure 1 represents a view of my invention. Fig. 2 is a detached view of the mop-holder, and Fig. 3 is a view in cross-section of the handle.

A represents a handle, preferably constructed of a single piece of wire 1, bent in the form shown in the drawings, the free ends thereof being turned inwardly to form a pair of arms or pintles 2 2, on which the mop-holder, to be hereinafter referred to, is mounted to turn. While the handle thus described is quite strong and durable, yet I prefer to further strengthen it by providing it with a metallic covering 3, which latter extends from one member to the other thereof and bent at its edges to envelop said members of the handle from a point slightly in advance of its free or closed end to a point slightly in rear of its open end. The covering 3 not only strengthens the handle and prevents it from becoming warped and bent out of shape, but also gives an attractive appearance to the handle.

The mop-holder 6 is preferably formed from a strip of sheet metal bent in the form of a rectangular loop, the ends thereof being riveted together, as shown at 7. The sheet-metal head is cut at intervals to form spurs 7ª to engage the mop. The bottom face of this mop-holder is provided with two bearings 8 8, each of which is struck up from the metal constituting said mop-holder and are adapted to receive and be revolubly supported by the arms or pintles 2 2 of handle A.

Supported within the loop formed by the mop-holder 6 is a mop 10, which latter may be made of any suitable material and of any desired size. This mop is preferably supported at its center, so as to allow of its being folded upon itself, thus lessening the chance of its becoming detached from the mop-holder.

By constructing handle A flat and in the manner described it will be readily seen that it is better adapted for use in cleaning windows than are the mops now in common use, as the flat handle will permit of the entire mop being introduced between the woodwork of the window-sashes, thus facilitating the cleaning of windows.

Having fully described my invention, what I claim as new, and desire to secure by Letters Patent, is—

1. A window-cleaner comprising a handle made of wire bent to form two parallel members, a sheet-metal strip connecting said members of the handle throughout a portion of the length thereof, the free ends of the members of the handle having inwardly-projecting pintles, a head having loops or bearings, the free ends of the members of the handle being sprung laterally and loosely entering said loops or bearings on the head, substantially as set forth.

2. The combination with a handle, of a mop-head pivotally attached thereto, said head consisting of an elongated loop of sheet metal having spurs cut therefrom and adapted to engage a mop passed through said head, substantially as set forth.

In testimony whereof I have signed this specification in the presence of two subscribing witnesses.

ALICE S. KEMP.

Witnesses:
 JOS. A. KNOX,
 HENRY R. LOSKAMP.